US005781444A

United States Patent [19]

Ishida et al.

[11] Patent Number: 5,781,444

[45] Date of Patent: Jul. 14, 1998

[54] DISTRIBUTED PROCESSING UNIT CONNECTABLE TO EXTERNAL PROCESSING MEANS

[75] Inventors: Takeshi Ishida, Sakado; Yuichi Sakamoto, Higashi-matsuyama; Genzo Yoshizawa, Tokyo, all of Japan

[73] Assignee: Kabushiki Kaisha Nippon Conlux, Japan

[21] Appl. No.: 592,329

[22] PCT Filed: May 12, 1995

[86] PCT No.: PCT/JP95/00913

§ 371 Date: Jan. 11, 1996

§ 102(e) Date: Jan. 11, 1996

[87] PCT Pub. No.: WO95/31797

PCT Pub. Date: Nov. 23, 1995

[30] Foreign Application Priority Data

May 13, 1994 [JP] Japan .................................... 6-100160

[51] Int. Cl.[6] .............................. G06F 17/00; G06F 7/00; G07F 5/00

[52] U.S. Cl. ...................... 364/479.02; 194/217; 194/218

[58] Field of Search ............................ 324/202; 194/217, 194/218; 364/479.01, 479.02, 479.03; 371/20.5

[56] References Cited

U.S. PATENT DOCUMENTS

| | | | |
|---|---|---|---|
| 3,918,564 | 11/1975 | Heiman et al. | 194/318 |
| 3,918,565 | 11/1975 | Fougere et al. | 194/317 |
| 4,272,757 | 6/1981 | McLaughlin et al. | 340/825.35 |
| 4,366,481 | 12/1982 | Main et al. | 340/825.54 |
| 4,482,964 | 11/1984 | Berstein et al. | 364/510 |
| 4,611,205 | 9/1986 | Eglise | 340/825.35 |
| 4,872,541 | 10/1989 | Hayashi | 194/217 |
| 5,078,252 | 1/1992 | Furuya et al. | 194/318 |
| 5,330,041 | 7/1994 | Dobbins et al. | 194/206 |
| 5,464,087 | 11/1995 | Bounds et al. | 194/200 |
| 5,522,491 | 6/1996 | Baudat et al. | 194/207 |

FOREIGN PATENT DOCUMENTS

| | | |
|---|---|---|
| 61-136168 | 6/1986 | Japan . |
| 63-58700 | 3/1988 | Japan . |
| 1-302488 | 12/1989 | Japan . |
| 2-27596 | 1/1990 | Japan . |
| 3-90952 | 4/1991 | Japan . |
| 5-233914 | 10/1993 | Japan . |
| 5-233914A | 10/1993 | Japan . |
| 6-103510 | 12/1994 | Japan . |

*Primary Examiner*—Reba I. Elmore
*Assistant Examiner*—Robert J. Dolan
*Attorney, Agent, or Firm*—Handal & Morofsky

[57] ABSTRACT

A distributed processing unit which permits easy modification of set data that has been written in a memory (19) of a coin selector (1-1) which constitutes a processor. A computer (50) is connected to a connection line that connects the memory (19) and a CPU (11) of the coin selector (1-1), and to a mode terminal of the CPU (11), signals applied to the mode terminal of the CPU (11) prohibit access to the memory (19) by the CPU (11) and enable direct access to the memory (19) by the computer (50) so that the set data in the memory (19) can be overwritten under the control of the computer (50).

9 Claims, 10 Drawing Sheets

DISTRIBUTED PROCESSING UNIT CONNECTABLE TO EXTERNAL PROCESSING MEANS

TECHNICAL FIELD

The present invention relates to a distributed processing unit comprising at least one processor connected in a distributed configuration to a main controller through a signal line, and more particularly to a distributed processing unit designed so that set data stored in a memory in each processor can be read from and written to externally, thus facilitating modification of set data in the processor.

BACKGROUND ART

Distributed processing units recently proposed for use in automatic vending machines and the like include those comprising functional devices, for example, coin mechanisms which incorporate coin selectors, bill discriminators, card reader/writers, article conveyers, panel display units, and the like, which are connected in a distributed configuration to a main controller through a signal line.

In automatic vending machines and the like configured as distributed processing units of this type, the various functional devices communicate with the main controller through a signal line and perform their respective function processes.

For example, in a coin selector, data pertaining to permissible values for use in discriminating among coins, that is, upper limit values and lower limit values which define a permissible level range for each coin, is pre-stored in a memory as set data, the characteristics of inserted coins are measured by a measurement sensor, and the signals obtained thereby are compared with the set data stored in the memory in order to determine the validity and denomination of the inserted coins.

In a bill discriminator, data pertaining to permissible values for use in discriminating between bills, that is, upper limit values and lower limit values which define permissible level ranges for the plurality of measurement points on each bill, is pre-stored in a memory as set data, the characteristics of inserted bills at each measurement point are measured by a measurement sensor, and the signals obtained thereby are compared with the set data stored in the memory in order to determine the validity and denomination of the inserted bills.

In a card reader/writer, identification data for identifying cards is pre-stored in a memory as set data, the characteristics of the identification data of an inserted card are measured by a measurement sensor, and the signals obtained thereby are compared with the set data stored in the memory in order to determine the validity and denomination of the inserted coins.

In conventional distributed processing units of this type, set data to be stored in a memory is specified in advance and the set data is written into a memory (ROM) using a ROM writer or the like. This ROM is installed in the coin selector, bill discriminator, card reader/writer, and the like so as to be installed in each functional device.

However, with the foregoing configuration, it is not possible to specify set data adapted to variations in measurement sensors and other components of individual functional devices.

Also, designs for a coin selector in which a dedicated terminal for connection with a computer is provided, the computer is connected to this terminal so that measured values of coin characteristics are collected by the computer, permissible values for coin selection (upper limits and lower limits which define permissible ranges for valid coins) are calculated from these measured values of the coin characteristics, the permissible values for coin selection are written into a ROM using a ROM writer, and the ROM to which the permissible values for coin selection have been written is installed in the coin selector have been proposed, for example in Japanese Laid-Open Patent Application 5-233914, but such designs require the provision of a ROM writer for writing the permissible values for coin selection which have been calculated by the computer to the ROM.

An object of the present invention is to provide a distributed processing unit which permits easy modification of set data that has been written to the memory of each processor.

DISCLOSURE OF THE INVENTION

In order to achieve the above-mentioned object, this invention is a distributed processing unit comprising at least one processor connected in a distributed configuration to a main controller through a signal line so that the processor communicates with the main controller through the signal line to perform specified processes, wherein the processor comprises a memory for storing set data for performing the specified processes, a control unit for performing the specified processes on the basis of the set data stored in the memory, a first terminal, provided to a connection line which connects the memory and the control unit, for detachably connecting external data processing means, and a second terminal, provided to the control unit, for detachably connecting the external data processing means, and wherein the control unit comprises first control means for switching to a first mode whereby access to the memory by signals applied to the second terminal is prohibited while direct access to the memory by the external data processing means through the first terminal is enabled when the external data processing means is connected to the first and second terminals.

In the present invention, external data processing means is connected to a first terminal provided to a connection line which connects a memory and a control unit of a processor and to a second terminal provided to the control unit, so that settings in the set data that has been written to the processor memory can be modified using the external data processing means.

This configuration makes it possible to easily modify settings in set data written to the memory of the processor with the memory being mounted on the processor.

In addition, modification of settings in the set data written in the memory is performed directly by the external data processing means, thus obviating the need for a ROM writer or the like.

BEST MODE FOR CARRYING OUT THE INVENTION

An embodiment of the distributed processing unit which pertains to this invention will be described in detail below with reference to the appended drawings.

Figure 1:
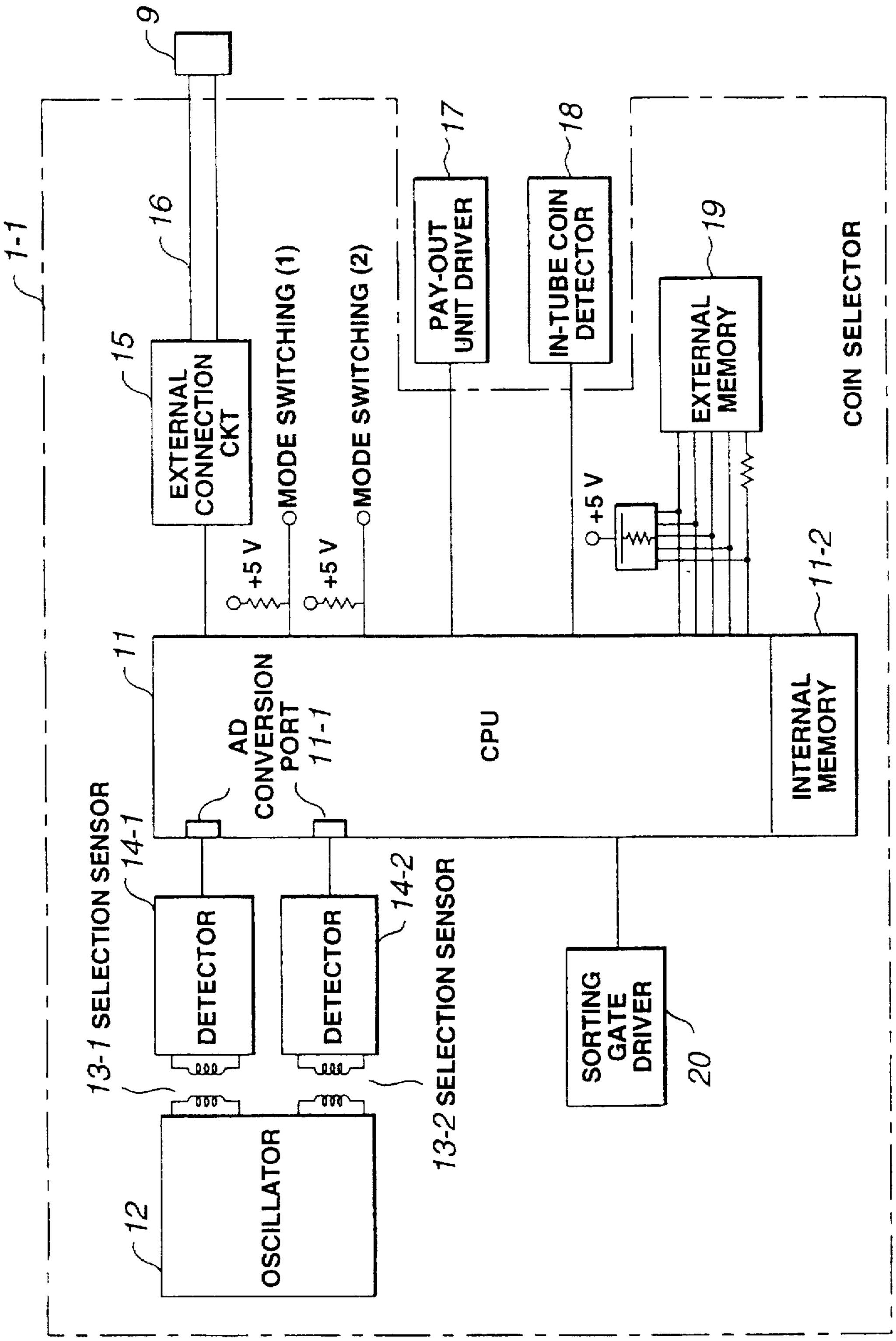
FIG. 1 is a block diagram depicting details of the configuration of a coin selector in an automatic vending machine coin mechanism in an embodiment of the present invention.
Figure 2:
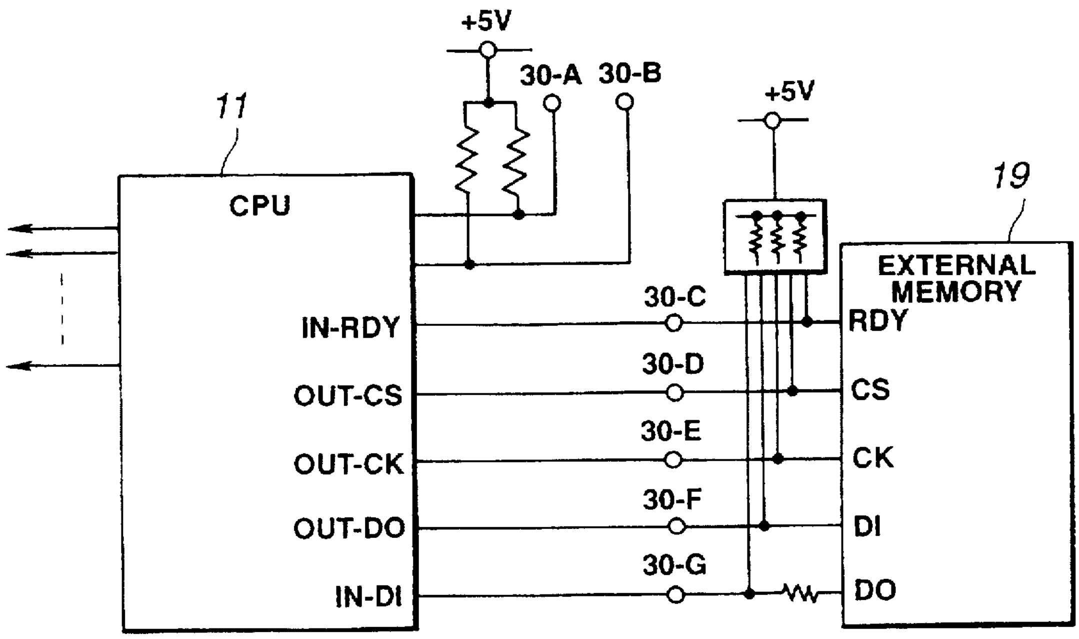
FIG. 2 is a detailed illustration of the CPU and the external memory depicted in FIG. 1.
Figure 3:
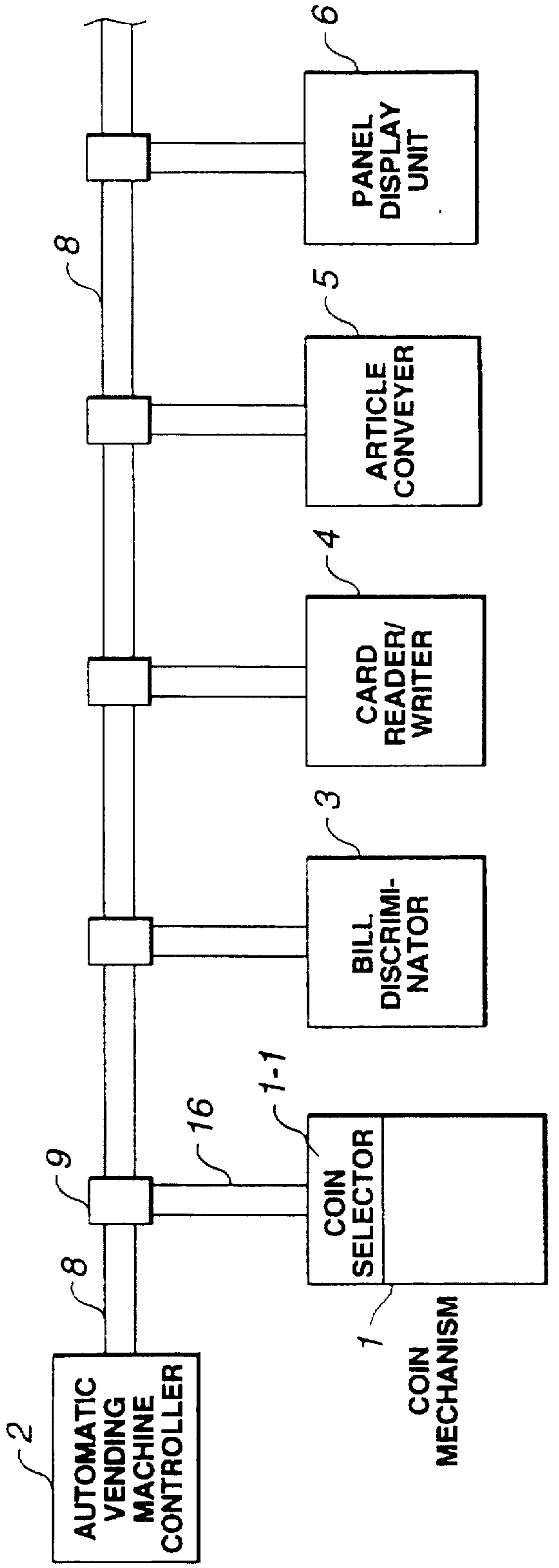
FIG. 3 is a block diagram depicting the overall configuration of an automatic vending machine in which the invention is implemented.
Figure 4:
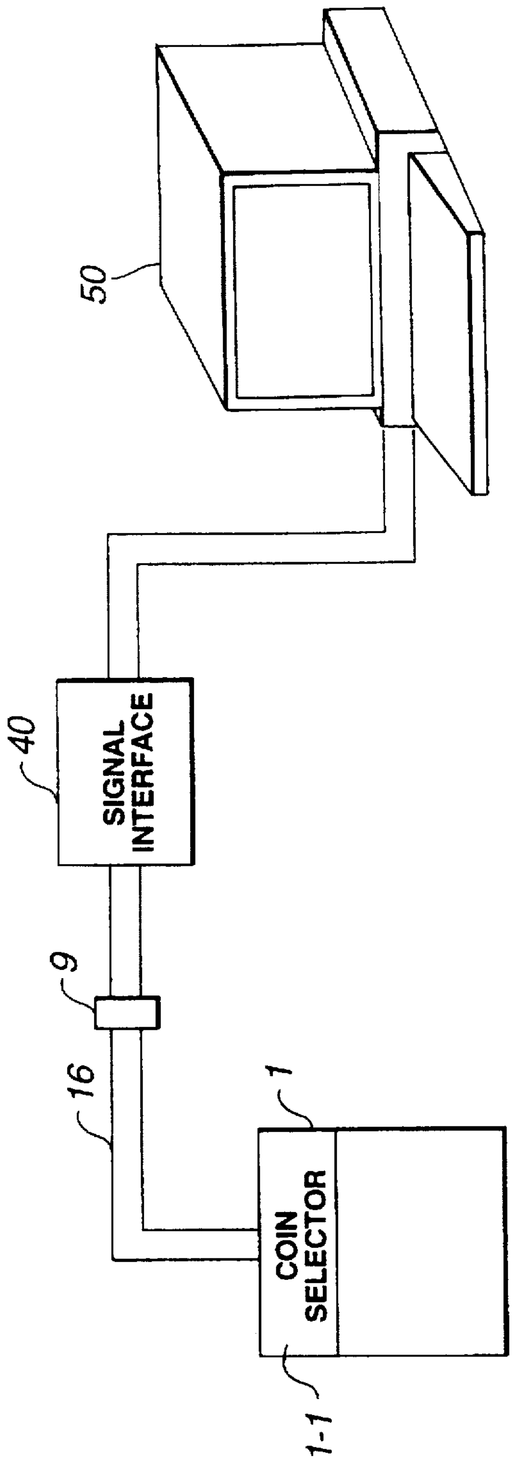
FIG. 4 is a diagram depicting connection of a computer to a coin mechanism in an embodiment of the present invention.
Figure 5:
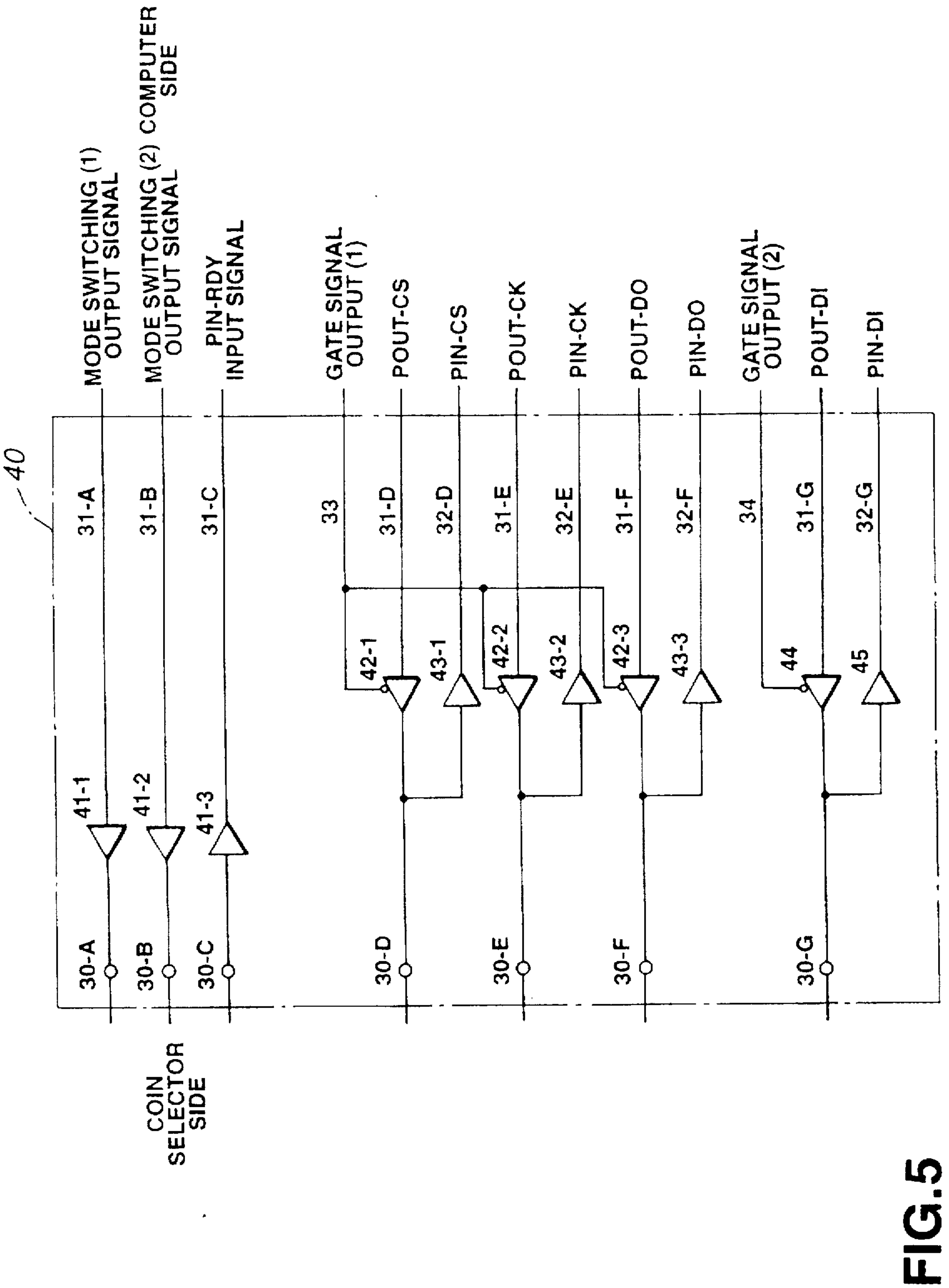
FIG. 5 is a detailed circuit diagram of an interface circuit provided to the coin mechanism and the computer depicted in FIG. 4.

FIG. 1 is a circuit diagram of a coin selector 1-1 in a coin mechanism 1 of an automatic vending machine in which the distributed processing unit of the present invention is implemented. FIG. 2 is a detailed illustration of a CPU 11 and an external memory 19 depicted in FIG. 1. FIG. 3 is a diagram depicting the overall configuration of an automatic vending machine in which the distributed processing unit of the present invention is implemented. FIG. 4 is a diagram depicting connection of the coin mechanism 1 and a computer 50. FIG. 5 is a circuit diagram of an interface circuit 40 provided between the coin mechanism 1 and the computer 50 when the two are connected.

In FIG. 3, the automatic vending machine is configured as a distributed processing unit wherein various processors such as a coin mechanism 1, a bill discriminator 3, a card reader/writer 4, an article conveyer 5, a panel display unit 6 are connected in a distributed configuration to an automatic vending machine controller 2 (a main controller) through a signal line 8.

In this automatic vending machine, the functions of the individual processors, that is, the coin mechanism 1, the bill discriminator 3, the card reader/writer 4, the article conveyer 5, and the panel display unit 6, are activated in response to control signals from the automatic vending machine controller 2, and the responses produced as a result thereof are returned to the automatic vending machine controller 2 as necessary, so as to perform the functions of the automatic vending machine.

The individual processors, that is, the coin mechanism 1, the bill discriminator 3, the card reader/writer 4, the article conveyer 5, and the panel display unit 6, are each connected to the signal line 8 through connectors.

For example, the coin mechanism 1 is provided with a coin selector 1-1 for selecting among inserted coins, and this coin mechanism 1 is connected to the signal line 8 from the automatic vending machine controller 2 through an external connection signal line 16 and a connector 9.

Next, details of the structure of the coin selector 1-1 in the coin mechanism 1 depicted in FIG. 3 will be described with reference to FIG. 1 and FIG. 2.

In FIG. 1, the coin selector 1-1 is provided with selection sensors 13-1 and 13-2 for selecting among inserted coins, each of which sensors is provided with a transmission coil and a reception coil. The transmission coils of the selection sensors 13-1 and 13-2 are connected to an oscillator 12, and the reception coils of the selection sensors 13-1 and 13-2 are connected to detectors 14-1 and 14-2.

When a coin passes between the transmission coils and the reception coils of the selection sensors 13-1 and 13-2, mutual inductances between the coils change depending on the material of the coin so that voltages induced in the reception coils of the selection sensors 13-1 and 13-2 change.

The detectors 14-1 and 14-2 detect the change in the voltages, and input measured values for the coin to the A/D conversion port 11-1 of the central processing unit (CPU) 11 which constitutes the control unit.

The CPU 11 compares the measured values with upper limit values and lower limit values (stored in the external memory 19) that define permissible level ranges for coins, and determines that the coin is valid if the measured values fall between the upper limit values and lower limit values.

The upper limit values and lower limit values are set with reference to each denomination, and the CPU 11 compares the measured values with these denomination-specific upper limit values and lower limit values to determine the validity and denomination of the inserted coins. A sorting gate driver 20 is operated in accordance with the result of the determination so that coins determined to be valid are sorted by denomination into coin tubes or a safe (not shown), and so that false coins are returned.

When the coins have been sorted, the CPU 11 computes the inserted amount from the coin denominations and the number of coins inserted and notifies the automatic vending machine controller 2 of the result, whereupon the article conveyer 5 depicted in FIG. 2 is controlled by instructions from the automatic vending machine controller 2 so that the article is dispensed and, if change is to be returned, a change pay-out driver 17 is operated so that change is paid out from the coin tubes.

The CPU 11 also controls the discharge of valid coins of a given denomination to the safe when an in-tube coin detector 18 has detected that a coin tube is full.

The CPU 11 also controls to display an "out of change" message as necessary when the in-tube coin detect or 18 has detected that a coin tube is empty.

The reference numeral 11-2 indicates an internal memory provided internally to the CPU 11.

In the foregoing description, the use of changes in mutual inductances between the coils for the selection sensors 13-1 and 13-2 was described, but a configuration in which changes in capacitances or the like, or in which a combination of a plurality of sensors which operate on different principles is employed, could be used to improve reliability.

In this embodiment, as shown in FIG. 2, the connection lines between the CPU 11 and the external memory 19 of the coin selector 1-1 are provided with connection pins 30C through 30G for connection to an external computer 50.

Connection pins 30-A and 30-B are also provided to the input terminal for inputting CPU 11 mode-switching signals.

These connection pins 30-A through 30-G are connected to normally unused pins of the connector 9 which connects to the signal line 8 from the automatic vending machine controller 2.

Next, an explanation will be given with regard to operations in the case of overwriting set data stored in the external memory 19 of the coin selector 1-1 in this embodiment.

In this embodiment, the CPU 11 of the coin selector 1-1 is connected to the connector 9 through an external connection circuit 15 and an external connection signal line 16. During normal operation, this connector 9 is connected to the signal line 8 from the automatic vending machine controller 2.

However, when the set data stored in the external memory 19 of the coin selector 1-1 is to be overwritten, the connector 9 is disconnected from the signal line 8 and a computer 50 is connected to the connector 9 through a signal interface 40, as depicted in FIG. 4, whereby the connection pins 30-A through 30-G of the coin selector 1-1 are connected to the computer 50 so that set data stored in the memory of the coin mechanism 1 are overwritten under the control of the computer 50.

In the foregoing embodiment, the connector 9 for connection to the signal line 8 from the automatic vending machine controller 2, designed so that the connection pins 30-A through 30-G of the coin selector 1-1 are connected to normally unused pins of the connector 9 of the coin selector 1-1 which connects to the signal line 8 from the automatic vending machine controller 2, is used for connecting the coin selector 1-1 to the computer 50, but a configuration in which a connector other than this connector 9 is used for connecting the connection pins 30-A through 30-G of the coin selector 1-1 to the computer 50 is also possible.

Next, the process of overwriting set data stored in the external memory 19 of the coin selector 1-1 using the computer 50 will be described.

In this process, the mode-switching signal (1) (connection pin 30-A) goes to L level while the mode-switching signal (2) (connection pin 30-B) from the computer 50 remains at H level. This serves to notify the CPU 11 of the coin selector 1-1 that the external computer 50 has been connected.

It is possible to use a control unit (dedicated external input/output means) that can perform operations similar to those of the computer 50 in place of the computer 50 in this process.

If the duration for which the mode-switching signal (1) 30-A remains at L level persists for one second or more, the CPU 11 switches the output ports from the CPU 11 to the external memory 19 to input ports.

In this state, the external memory 19 connection ports of the CPU 11 all assume high impedance so that the CPU 11 of the coin selector 1-1 does not interfere with the signal exchange with the external computer 50.

When the external memory 19 connection ports of the CPU 11 assume high impedance, the computer 50 proceeds to the process of reading out the coin selection data from the external memory 19.

Thus, it is necessary to switch the CPU 11 of the coin selector 1-1 to coin selection data readout mode.

To accomplish this, the mode-switching signal (2) (connection pin 30-B) is temporarily switched from H level to L level, and then returned to H level.

The CPU 11 of the coin selector 1-1 detects the switching of the mode-switching signal (2) 30-B from L level to H level, switches the ports which had previously been switched to input mode back to output mode, and assumes coin selection data measurement mode.

In this mode, the coin selection data is first computed. Specifically, the coin selection data is obtained in the form of data from the A/D conversion port 1-1 of the CPU 11 through detection by the detectors 14-1 and 14-2 of changes in the voltage induced in the receiving coils as a plurality of coins of the same denomination, which have been inserted into the coin mechanism 1, pass between the transmission coils and the reception coils of the selection sensors 13-1 and 13-2.

When the coin selection data has been obtained, the CPU 11 places the OUT-CS signal (connection pin 30-D) at L level, rendering the memory 19 non-active. This L-level signal is sent through the buffer 43-1 depicted in FIG. 5 to the external computer 50 as a PIN-CS, and serves as a selection data transmission request signal.

Designations for the ports of the CPU 11 and the memory 19 in FIG. 2 are as follows. IN-RDY indicates an input port as seen from the CPU 11, and is a port for input of an RDY ready signal, which indicates a memory status. OUT-CS indicates an output port as seen from the CPU 11, and is an output port for a memory chip select signal CS. OUT-CK is similarly an output port, and is an output port for a memory clock signal CK. OUT-DO is similarly an output port, and is a data output port for output to the memory serial data input port DI. IN-DI is an input port, and inputs a data signal from the serial data output port DO.

Designations for the ports of the external computer 50 are as follows. As shown in FIG. 5, mode-switching signals (1) and (2) are signals that are input directly to the CPU 11. The RDY signal from the memory 19 is input as PIN-RDY. There are also input signals PIN- and output signals POUT- for the memory CS, CK, DO, and DI signals. These are selected through the mode-switching signals (1) and (2) and the gate signal outputs (1) and (2).

The external computer 50 detects a selection data transmission request by the CPU 11, sets the gate signal output (2) 34 to L level, and couples the POUT-DI signal (31-G) of the external computer 50 to the IN-DI (30-G) terminal of the CPU 11 of the coin selector 1-1.

Subsequently, clock-synchronized serial data transmission is performed in the manner depicted in the coin selection data transmission time chart described below until transmission of all of the coin selection data has been completed.

When the external computer 50 has received all of the coin selection data, it is used as a basis for processing data for each selection sensor and input coin denomination, and permissible ranges are computed on the basis of standard distributions to obtain upper limit values and lower limit values which define permissible ranges for each selection sensor and input coin denomination, to determine the data.

The upper limit values and lower limit values for the selection data determined by the computer 50 are written directly to the memory 19 in the manner shown in the computer operation flowchart, described below. Specifically, the CPU 11 mode-switching signal (1) 30-A is set to L level by the external computer 50 to switch the output ports from the CPU 11 to the external memory 19 to input ports to prevent interference by the CPU 11, and the gate signal output (1) 33 is set to L level so that the external computer 50 directly accesses the external memory 19 to perform the write operation.

The operation of the CPU 11 of the coin selector 1-1 and the computer 50 in this embodiment will be described referring to the flowcharts in FIG. 6 through FIG. 9.

Figure 6:
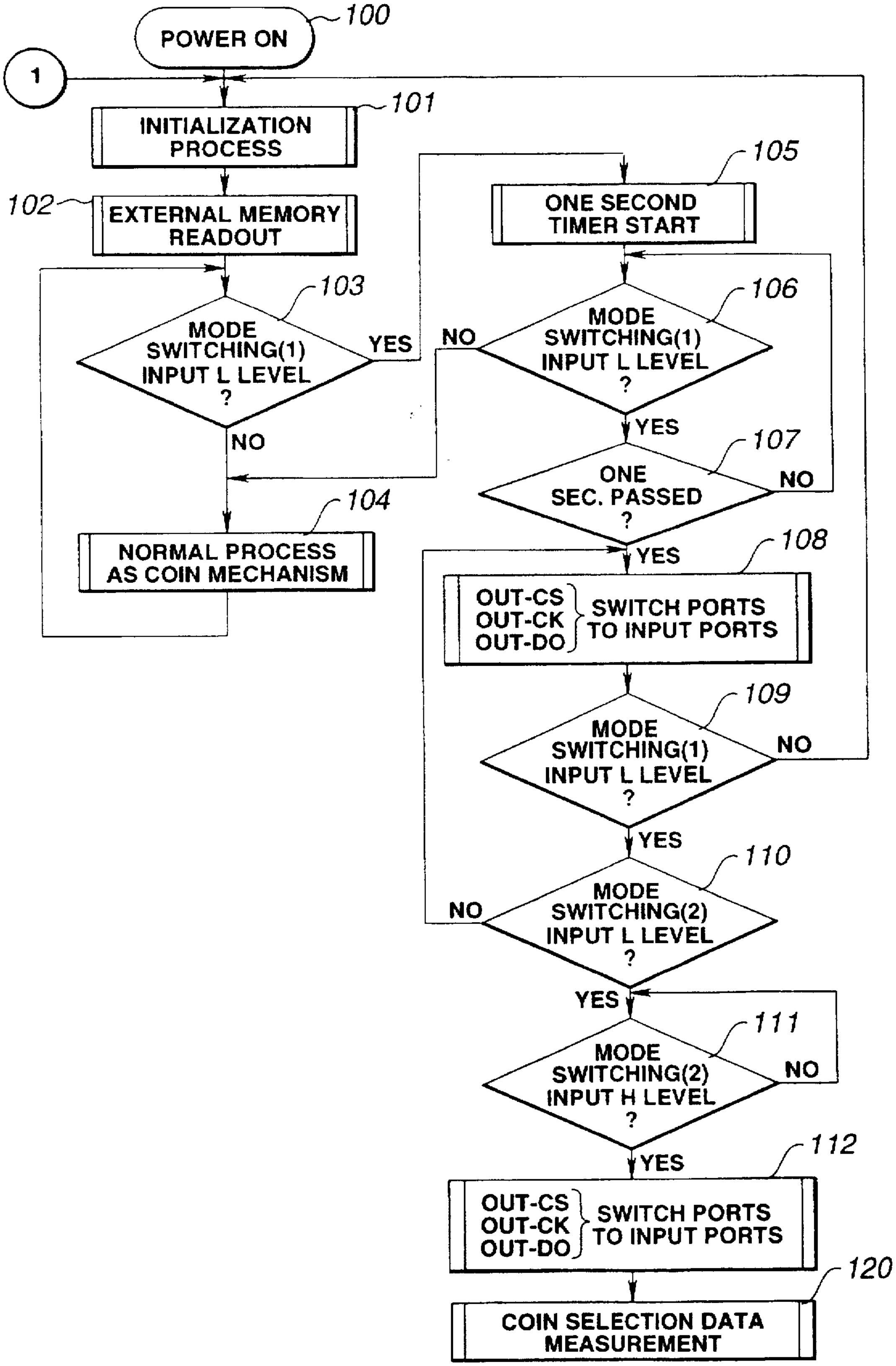
FIG. 6 is a flow chart which depicts the operation of the CPU of the coin mechanism coin selector depicted in FIG. 1.

FIG. 6 is an operational flowchart for the CPU 11 of the coin selector 1-1.

When the coin mechanism 1 power supply is turned on (100), an initialization process (101) is performed, and programs and selection data for use in selecting among coins are then read from the external memory 19 (102). The CPU 11 then determines whether the mode-switching signal (1) 30-A is L level or not (103), and if it is H level it begins normal coin selector processing (104).

The mode-switching signal (1) 30-A is monitored, and if L level is detected (103), a one-second timer is started (105).

The mode-switching signal (1) 30-A continues to be monitored (106), and if the mode-switching signal (1) 30-A does not remain at L level for more than one second, normal coin selector processing is resumed (104). If L level persists for more than one second (107), the output ports to the external memory OUT-CS (30-D), OUT-CK (30-E), and OUT-DO (30-F) are switched to input ports (108).

If the mode-switching signal (1) 30-A remains at L level (109), the mode-switching signal (2) 30-B is checked to determine if it is at L level or not (110), and when the mode-switching signal (2) 30-B changes from L level to H level (111), OUT-CS (30-D), OUT-CK (30-E), and OUT-DO (30-F) are switched back to output ports (112) and the coin selection data measurement subroutine (120) starts.

Figure 7:
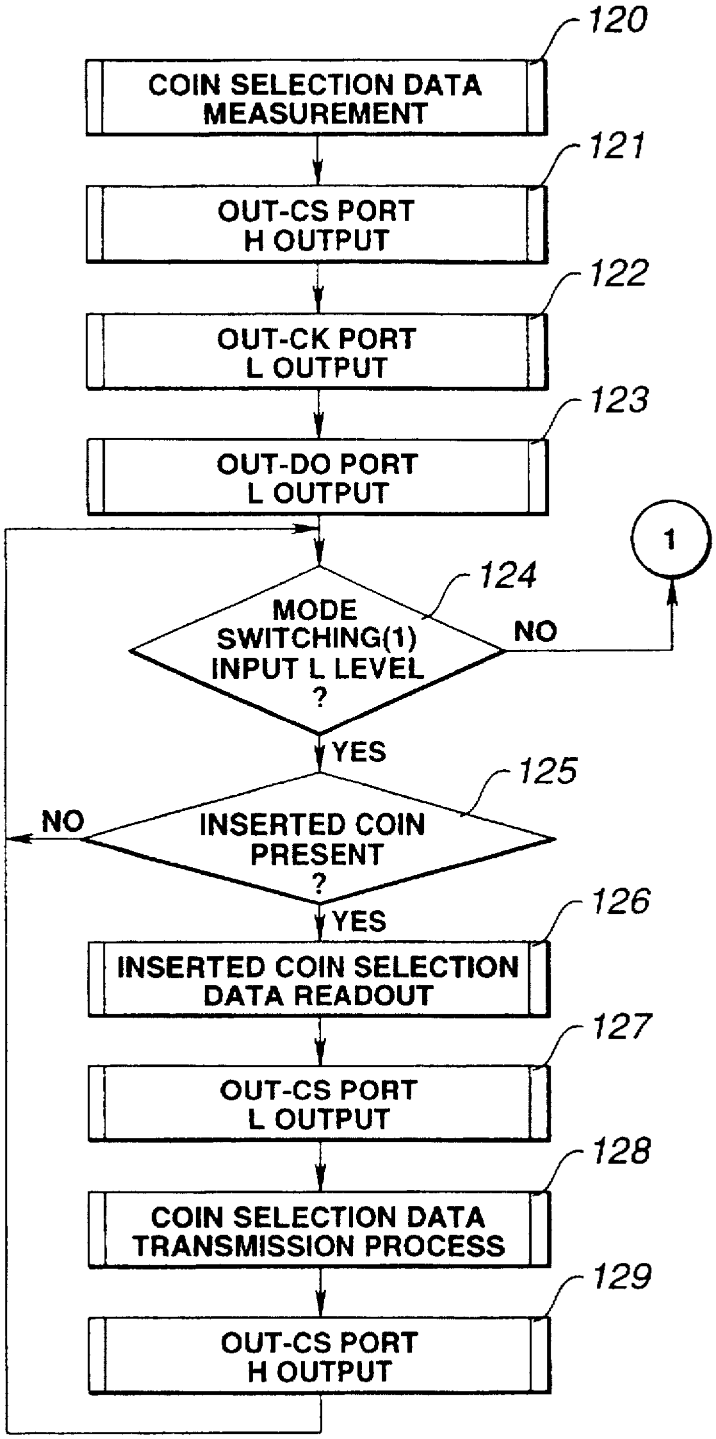
FIG. 7 is a flowchart of the coin selection data measurement subroutine in the operation flowchart depicted in FIG. 6.

FIG. 7 is a flowchart of this coin selection data measurement subroutine (120).

When the coin selection data measurement subroutine (120) starts, OUT-CS (30-D) is set to H level (121), OUT-CK (30-E) is set to L level (122), and OUT-DO (30-F) is set to L level (123), and if the mode-switching signal (1) 30-A remains at L level (124), coin insertion is awaited (125). When a coin is inserted, selection data for the inserted coin is read (126), OUT-CS (30-D) is set to L level (127), the process of transmitting coin selection data to the external computer 50 is executed (128), OUT-CS (30-D) is set to H level (129), and the system then returns to (124) and awaits insertion of another coin. If the mode-switching signal (1) 30-A is at H level when monitored in the flowchart, the system returns to the initial process (101) in the flowchart.

Figure 10:
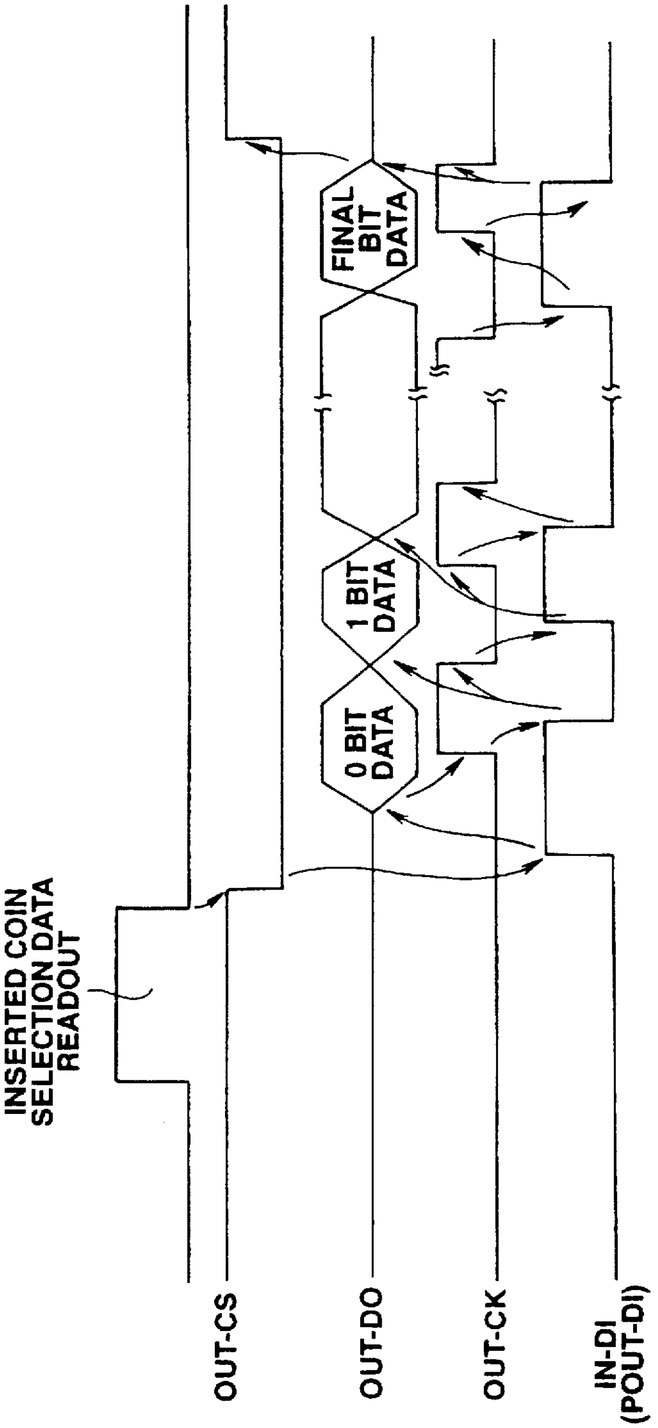
FIG. 10 is a time chart of signals in the coin selection data transmission process in an embodiment of the present invention.

A time chart of the various signals in the coin selection data transmission process is presented in FIG. 10.

Figure 8:
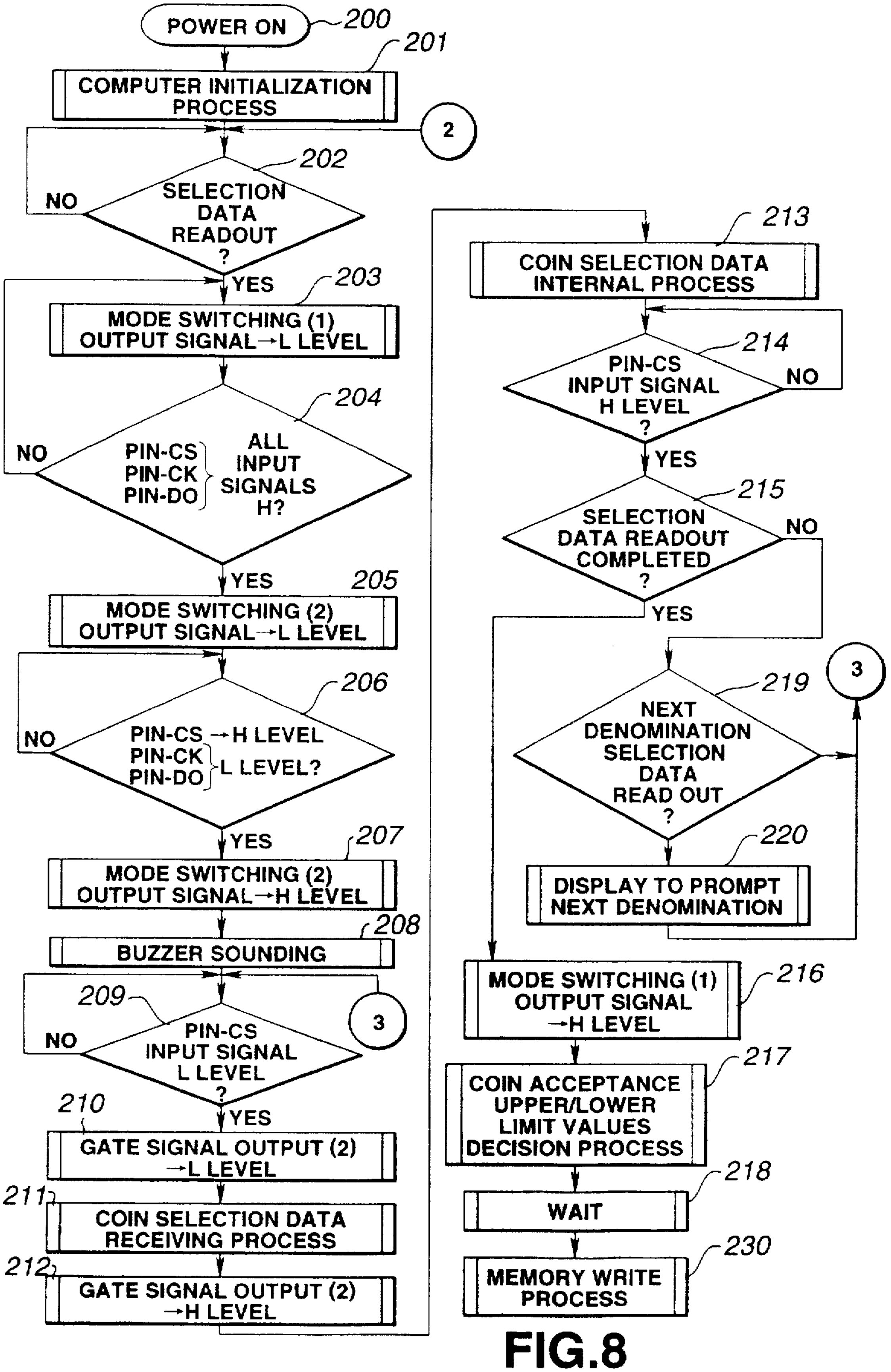
FIG. 8 is a flowchart depicting the operation of the computer depicted in FIG. 4.

FIG. 8 is an operational flowchart for the external computer 50.

When the external computer 50 is connected to the coin mechanism 1 as depicted in FIG. 4, and the power supply is turned on (200), the initialization process of the computer 50 is executed (201), the gate signal output (1) 33 is set to H level, and the gate signal output (2) 34 is set to L level. It is then determined whether selection data readout is to be performed (202), and if readout is to be performed, the mode-switching signal (1). 30-A is set to L level (203), and PIN-CS (32-D), PIN-CK (32-E), and PIN-DO (32-F) are checked to ensure that they are all at H level. (204). If this is the case, the mode-switching signal (2) 30-B is set to L level (205), PIN-CS (32-D) assumes H level, PIN-CK (32-E) and PIN-DO (32-F) assume L level, and the coin selector 1-1 confirms that selection data readout mode has been enabled (206).

If selection data readout mode has been enabled, the mode-switching signal (2) 30-B is returned to H level (207) and OUT-CS (30-D), OUT-CK (30-E), and OUT-DO (30-F) of the CPU 11 are set to output mode. A buzzer then sounds (208), and the system waits for PIN-CS (32-D) to go to L level (209). When it goes to L level, the gate signal output (2) 34 is set to L level (210) and the coin selection data reception process is performed (211).

When the coin selection data reception process has been completed, the gate signal output (2) 34 is set to H level (212) and internal processing of coin selection data reception is performed (213). When a series of processing of a coin selection data reception has been completed, PIN-CS (32-D) is checked to ensure that it is at H level (214), and completion of selection data readout is checked (215). If readout has not been completed, the next data readout operation is performed. At this time, switching to a new coin denomination (219) is accompanied by a display indicating that the next denomination should be inserted (220).

When selection data readout has been completed (215), the mode-switching signal (1) 30-A is set to H level (216) and a process to determine upper limit values and lower limit values for coin acceptance from coin selection data is performed (217).

When the process to determine upper and lower limit values for coin acceptance has been completed, the memory write process subroutine 230 is started after a brief waiting period (218).

Figure 9:
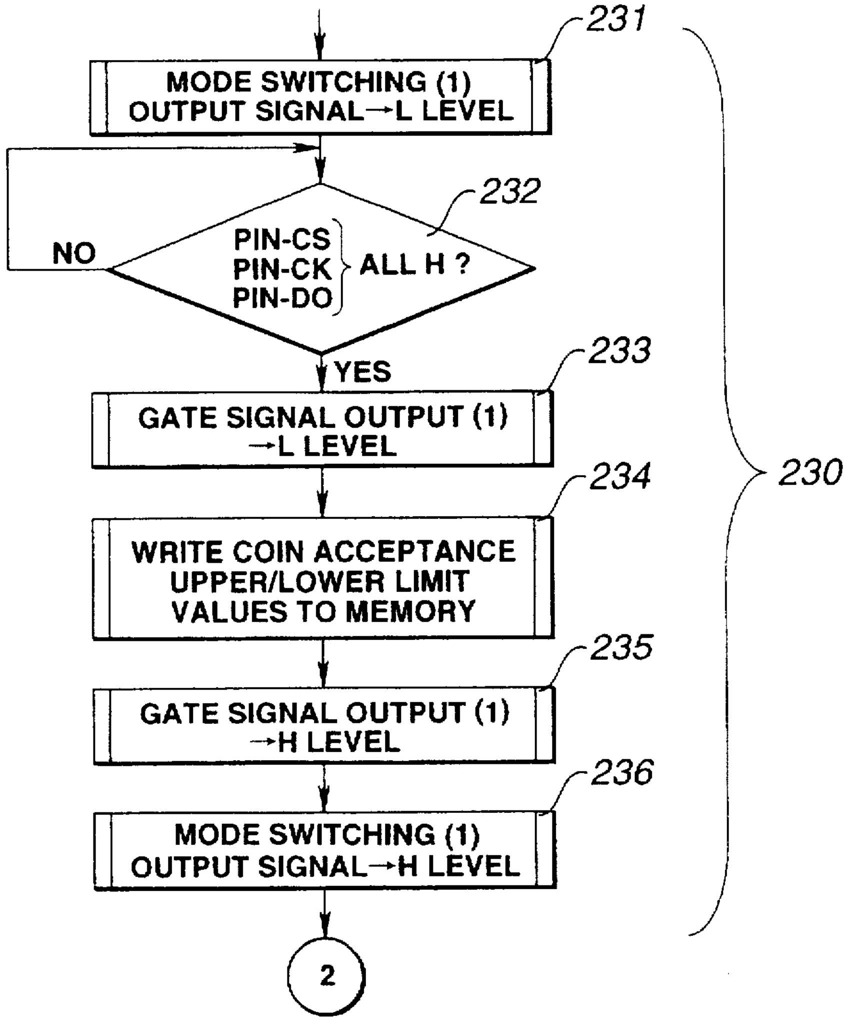
FIG. 9 is a flowchart of the memory write process subroutine in the operation flowchart depicted in FIG. 8.

FIG. 9 is a detailed flowchart of the memory write process subroutine 230. When the memory write process subroutine 230 starts, the mode-switching signal (1) 30-A is set to L level (231), and PIN-CS.(32-D), PIN-CK (32-E), and PIN-DO (32-F) are checked to ensure that they are all at H level (232). If this is the case, the gate signal output (1) 33 is set to L level (233), and the upper and lower limit values which have been decided for coin acceptance are written directly to the external memory 19 (234). The gate signal output (1) 33 then returns to H level (235), the mode switching signal (1) 30-A is set to H level (236), and the system returns to the initial state.

This system configuration not only obviates the need for a memory writer to write selection data, but allows newly determined data for coin acceptance to be set, or such data to be modified, without uninstalling the CPU 11 and the external memory 19 from the product.

In addition, since the selection sensors actually used in a product and actual coins are used in deciding determining values for coin acceptance, values for coin acceptance can be set taking into account variations between the selection sensors.

In addition, it is possible to modify to-be-selected-coin denominations after manufacture, as long as the mechanical configuration can accept coins.

In the foregoing description, the present invention was described in the context of the coin mechanism 1, but the present invention may be implemented similarly in the case of the bill discriminator 3 or the card reader/writer 4.

In the case of the bill discriminator 3, selection data for an inserted bill is transmitted to the computer 50 for each selection sensor, data for each of the selection sensors is processed by the computer 50, permissible ranges are computed assuming that the distribution of the selection data is a normal distribution, and upper limit values and lower limit values of these permissible ranges are decided for each selection sensor. The process is conducted with different inserted bills to decide upper limit values and lower limit values of permissible level ranges for bills of different denominations for each selection sensor.

The upper limit values and lower limit values of the permissible level ranges for bills for selection data for these different bill denominations, which have been decided by the computer 50, are written directly to the memory of bill discriminator 3 by the computer 50.

The bill discriminator 3 subsequently treats an inserted bill as genuine when selection data for an inserted bill falls within the permissible range for selection data which has been written in the memory, and treats it as counterfeit when the data does not fall within the permissible range.

Since permissible ranges for selection data are decided by this method in the bill discriminator 3, it is possible to use the same configuration regardless of bill denomination (unless there are prohibitive mechanical conditions) so that bill denomination may be modified subsequent to manufacture.

In the case of a card reader/writer 4, the computer 50 directly writes data such as card ID code, customer code, and other identifying data which is written on the card itself to the memory of the card reader/writer 4. The card reader/writer 4 subsequently determines the validity of an inserted card on the basis of the data which has been written to the memory.

With this method, it becomes unnecessary to produce memories with different memory contents for different cards, so a single device can be adapted to any particular acceptable card. In addition, in the case of modifications to the acceptable cards, it is not necessary to disassemble the device, so it can be adapted quickly to such modifications.

INDUSTRIAL APPLICABILITY

As noted above, with this invention, external data processing means is connected to a first terminal provided to a signal line which connects a processor memory and a control unit and a second terminal provided to the control unit, and settings in set data which has been written to the memory of the processor are modified using the external data processing means, so the set data which has been written to the memory of the processor can be easily modified without uninstalling the memory from the processor. Also, in this invention, the set data can be modified in memories of functional devices in an automatic vending machine configured as a distributed processing unit, such as a coin mechanism which incorporates a coin selector, a bill discriminator, a card reader/writer, an article conveyer, a panel display unit and other functional devices which are connected in a distributed configuration to a main controller through the signal line.

We claim:

1. A distributed processing unit including:

a maim controller;

a bus line connected to the main controller; and at least one processor connected to the bus line through a connector, which communicates with the main controller through the connector and the bus line to perform specified processes, wherein the processor comprises:

a memory for storing set data for performing the specified processes;

a control unit for performing the specified processes on the basis of the set data stored in the memory;

a first terminal connected to a connection line which connects the memory and the control unit;

a second terminal connected to the control unit; and connecting means for connecting the first and second terminals to external processing means, and wherein the control unit comprises:

first control means for prohibiting access to the memory by the control unit in response to signals applied to the second terminal from the external processing means while allowing direct access to the memory by the external processing means through the first terminal when the external processing means is connected to the first and second terminals by the connecting means.

2. A distributed processing unit as defined in claim 1, wherein the processor is a coin selector and the set data stored in the memory is set data for use in coin discrimination.

3. A distributed processing unit as defined in claim 1, wherein the processor is a bill discriminator and the set data stored in the memory is set data for use in bill discrimination.

4. A distributed processing unit as defined in claim 1, wherein the processor is a card reader/writer and the set data stored in the memory is set data for identifying cards.

5. A distributed processing unit as defined in claim 1, wherein the connecting means is configured by assigning the first and second terminals to idle terminals of the connector and, by disconnecting the connector from the bus line and connecting it to the external processing means, the connecting means connects the first and second terminals to the external processing means.

6. A distributed processing unit as defined in claim 1, wherein the external processing means comprises: a signal interface which transmits and receives signals to and from the control unit through the first terminal, and controls signal transaction with the memory or the control unit through the second terminal; and a data processor connected to the signal interface.

7. A distributed processing unit as defined in claim 1, wherein the control unit comprises:

second control means for disabling the memory by signals applied to the second terminal from the external processing means, and transmitting specified data to the external processing means through the first terminal when the external processing means is connected to the first and second terminals by the connecting means, and wherein the external processing means comprises data processing means for processing the specified data transmitted form the control unit and creating the set data in the memory.

8. A distributed processing unit as defined in claim 7, wherein the processor is a coin selector, the second control means transmits detected data for a plurality of valid coins in the coin selector to the external processing means, and the data processing means creates set data for discriminating among coins to be stored in a memory of the coin selector from normal distributions of the detected data for the plurality of valid coins transmitted from the coin selector.

9. A distributed processing unit as defined in claim 7, wherein the processor is a bill discriminator, the second control means transmits detected data for a plurality of valid bills in the bill discriminator to the external processing means, and the data processing means creates set data for discriminating among bills to be stored in a memory of the bill discriminator from normal distributions of the detected data for the plurality of valid bills transmitted from the bill discriminator.

* * * * *